United States Patent [19]

Grube et al.

[11] Patent Number: 5,483,465
[45] Date of Patent: Jan. 9, 1996

[54] METHOD FOR REPROGRAMMING DUPLICATED COMMUNICATION UNITS

[76] Inventors: Gary W. Grube, 157 Cedarwood Ct., Palatine, Ill. 60067; Timothy W. Markison, 555 Northview La., Hoffman Estates, Ill. 60194; Thomas E. Weston, 10476 Ridge La., Marengo, Ill. 60152

[21] Appl. No.: 144,599

[22] Filed: Oct. 28, 1993

Related U.S. Application Data

[63] Continuation-in-part of Ser. No. 23,512, Feb. 26, 1993, abandoned.
[51] Int. Cl.[6] ................................ H04B 7/00; H04Q 7/22
[52] U.S. Cl. ........................ 364/516; 379/59; 379/60; 379/94; 340/825.34; 455/54.1; 455/49.1; 455/33.1; 455/186.1
[58] Field of Search ..................... 455/54.1, 49.1, 455/33.1, 33.2, 186.1; 379/59, 60, 94; 340/825.34; 364/514

[56] References Cited

PUBLICATIONS

Fenner, P. R. Abstract title: Mobile address management and billing for Personal Communications IEEE, Sep. 10, 1992, Conference.

*Primary Examiner*—Edward R. Cosimano
*Assistant Examiner*—Kamini S. Shah
*Attorney, Agent, or Firm*—Christopher P. Moreno

[57] ABSTRACT

A monitoring computer (115) monitors a communication resource within a wireless communication system for transmissions by communication units. Upon detecting transmissions, which contains a communication unit personality code, the monitoring computer compares transmission time and location information, stored in a database (117), for the communication unit to determine if multiple communication units are using the same communication unit personality code. If multiple communication units are detected, the monitoring computer reprograms at least a portion of service access information of the communication units. In this manner, discrepancies in communication unit programming may be detected and corrected.

12 Claims, 3 Drawing Sheets

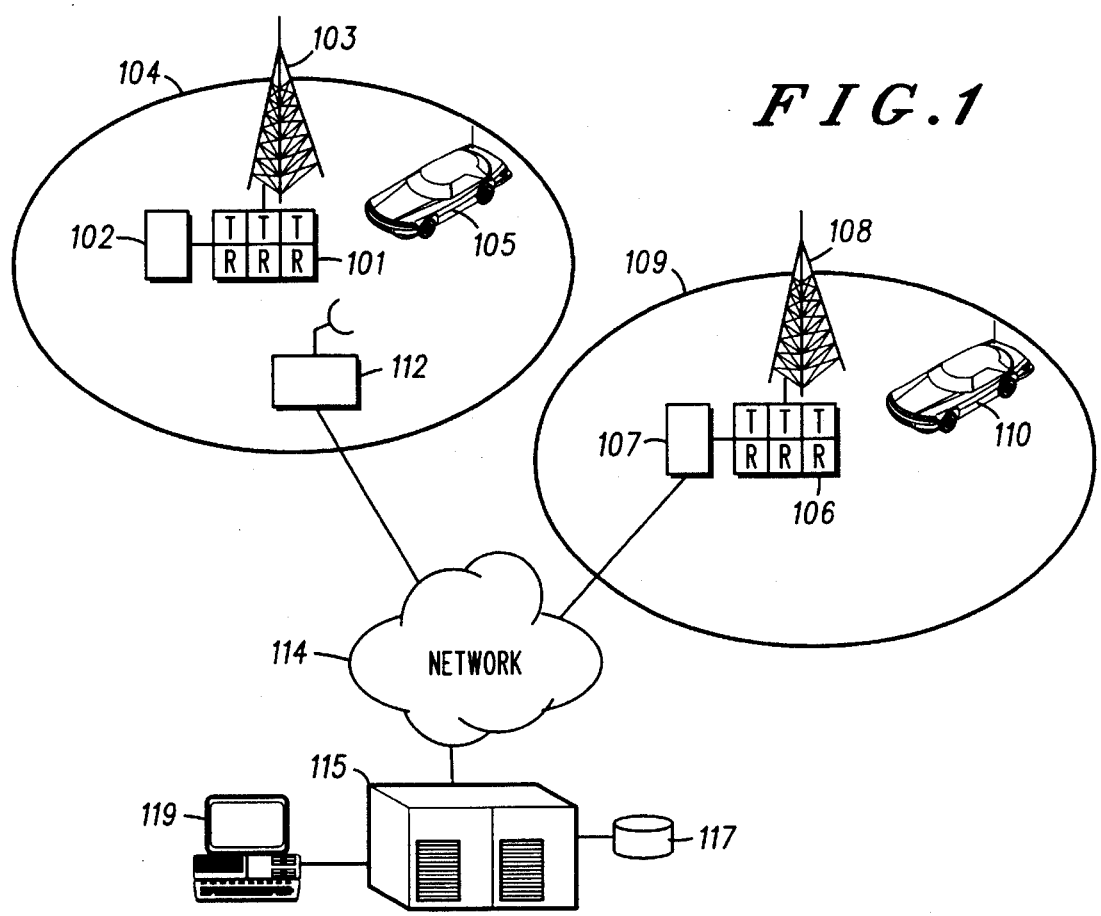

METHOD FOR REPROGRAMMING DUPLICATED COMMUNICATION UNITS

This patent application is a continuation in part of application having a serial number of Ser. No. 08/023,512, filing date Feb. 26, 1993, entitled "Detection Of Duplicate Identification Codes In Communication Units", now abandoned.

FIELD OF THE INVENTION

The present invention relates generally to communication systems and, in particular, to a method for reprogramming duplicated communication units.

BACKGROUND OF THE INVENTION

The basic operation and structure of land mobile radio communication systems and cellular radio/telephone communication systems (communication systems) are known. Communication systems typically comprise a plurality of communication units (vehicle mounted or portable radios in a land mobile system and radio/telephones in a cellular system), a predetermined number of repeaters, located throughout a geographic region, that transceive information via communication channels, and a controlling entity. The controlling entity may either be a centralized call processing controller or a network of distributed controllers working together to establish communication paths for the communication units.

In the course of normal operations, communication units can often utilize various communication services or features to communicate with one another. For instance, a communication unit may be capable of group dispatch, private call, secure voice, telephone interconnect and other services (as found in a Motorola SmartNet™ or Privacy Plus™ communication system), or a subset of such services. The provision of multiple communication services typically add value to those communication units capable of such services. This added value is often reflected by communication system manufacturers as an added premium to the cost of the communication units. For instance, a customer may purchase a Privacy Plus™ system and pay an extra fee to allow a certain group of mobiles to have additional telephone interconnect capabilities. Quite often, the distinguishing characteristics between a "regular" mobile and an "enhanced" mobile are the software applications operating within each communication unit.

Typically, there are two techniques which allow the selective utilization of software applications by a communication unit. In the first technique, each communication unit is programmed at the manufacturer's factory with software applications stored in a non-volatile memory such as PROM (programmable read-only memory). Regular and enhanced communication units are distinguished by codeplug bits which enable various software applications. Thus, the non-volatile memories of both a regular and enhanced communication unit contain the same software, but those applications necessary for additional types of communication are enabled (via the codeplug bits) only in enhanced communication units. Alternatively, an external programming device may be used to enable software applications. For instance, many communication products made by Motorola utilize Radio Service Software (RSS), which operates on a typical personal computer, to enable various software features.

A second technique for selective software utilization is to add software applications via an external programming device similar to RSS. For this technique, individual communication units contain a re-programmable non-volatile memory such as EEPROM (electrically erasable programmable read-only memory) for storing the software applications. Thus, the memory of a regular communication unit will contain only those software applications necessary for basic operation whereas the memory of an enhanced communication unit will contain additional software applications. Unfortunately, neither of the two techniques discussed above are able to fully prevent unauthorized use of software applications resulting from illicitly duplicated communication units.

It is possible for a user to copy the non-volatile memory of an enhanced communication unit and place the replicated software applications into the non-volatile memory of a regular unit, thereby creating a substantially identical enhanced unit without paying an additional fee. Such tactics are often employed in systems where a user is charged according to the number of communication unit identification codes (unit ID codes) used in the system. By duplicating a communication unit's memory, and hence its ID code, additional communication units can be provided. Alternatively, anyone in possession of the appropriate external programming device can illicitly enable unauthorized software applications. Although many communication systems possess means for denying access to communication units that are incorrectly programmed, some system operators do not enable these means, thus allowing unauthorized use. Furthermore, while many communication systems possess means for denying access to communication units that are incorrectly programmed, they are not capable of detecting the extent of the incorrect programming nor are they capable of correcting the incorrect programming. The unauthorized use and duplication of software applications and unit ID codes not only cheat manufacturers of their entitled fees, they also overburden critically scarce communication resources and interfere with the authorized communications of other communication units.

Therefore a need exists for a method which allows the detection of illicitly duplicated communication units and allows such unauthorized duplications to be correctly reprogrammed.

BRIEF DESCRIPTION OF THE DRAWINGS

FIG. 1 illustrates a multi-site communication system, equipped with a monitoring computer, in accordance with the present invention.

FIG. 2 illustrates a database format which may be used by the monitoring computer in accordance with the present invention.

DESCRIPTION OF THE PREFERRED EMBODIMENT

Figure 3:
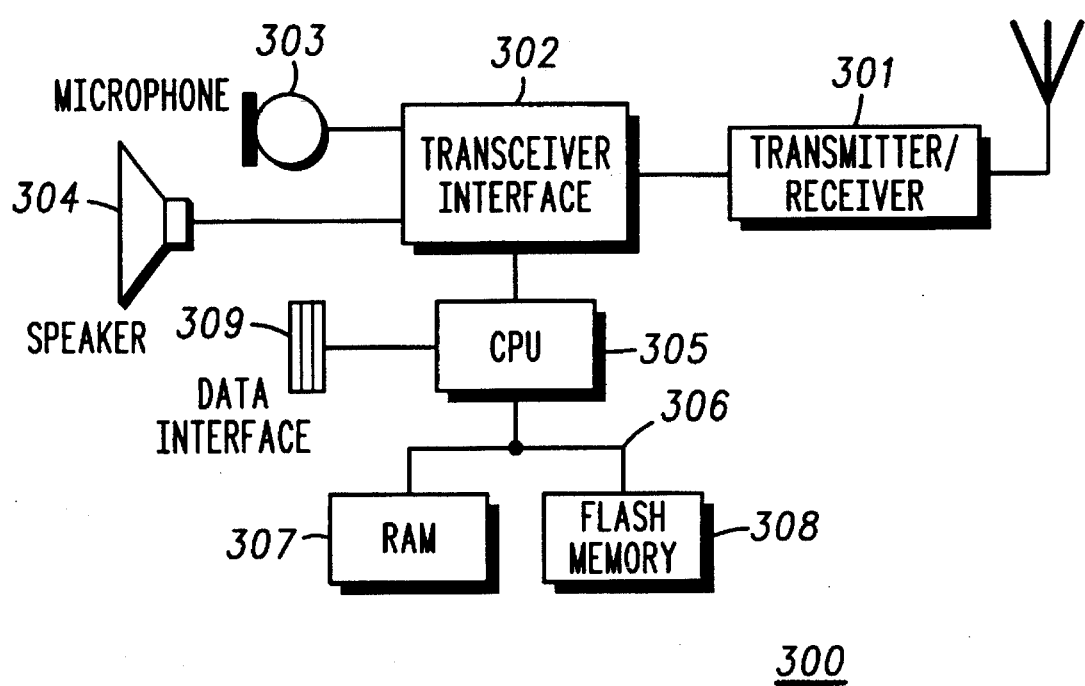
FIG. 3 illustrates a block diagram of a communication unit in accordance with the present invention.

Generally, the present invention provides a method for reprogramming duplicated communication units in a wireless communication system. This is accomplished by associating a monitoring computer with the communication system to monitor communication resources within the communication system. While monitoring communication resources, the monitoring computer compares communication unit personality codes with a database of stored service access information, thus detecting illicit duplication. Once unauthorized duplication has been detected, the monitoring computer transmits a command to reprogram the communication unit's service access information in accordance with the stored information. With such a method, unauthorized duplication of communication units within a wireless communication system can be readily corrected, thus freeing up valuable communication resources for authorized users.

The present invention can be more fully described with reference to FIGS. 1-4. FIG.1 illustrates multiple communication systems (104, 109) operably connected to a monitoring computer (115). Each communication system (104, 109) comprise a plurality of communication units (105, 110), a predetermined number of base stations (101, 106) operably connected to fixed antenna systems (103,108), and a call processing controller (102, 107). The call processing controller (102, 107), which may be a Motorola Smartzone Zone Controller, transmits and receives, via the base stations (101, 106), control information to establish communications between two or more communication units.

A monitoring computer (115), connected to a database (117) and a computer terminal (119), is operably coupled to the communication systems (104, 109) via a network (114). The monitoring computer (115), database (117), and computer terminal (119) may comprise a commercially available mid-range computing device, such as an IBM AS400. As shown, there are at least two ways to couple the monitoring computer (115) to the communication systems (104, 109). First, a communication system (104) may be connected to the network (114) by way of an over-the-air radio modem (112), which in turn communicates with the call processing controller (102) over at least one channel in the group of base stations (101). Alternatively, the network (114) connection can be established directly to the call processing controller (107).

In either case, the coupling allows the monitoring computer (115) to extract relevant control information regarding the communication systems (104, 109) from the network protocol and to access communication resources when needed to reprogram a communication unit (discussed in detail below). The manner in which the monitoring computer (115) is coupled to the network (114) as well as the manner in which control information is routed to the monitoring computer (115) is dependent upon the actual computing device used to implement the monitoring computer (115) and the network protocol. For example, if the network (114) is a public telephone switching network (PTSN), the monitoring computer (115) would need a modem as would the call processing controller (107).

FIG. 2 illustrates tables of the database (117) that contain, for each communication unit being monitored, stored service access information. In the first table, a unit ID code field (201) represents the identities of the communication units. Communication units are normally assigned a unique identity code to differentiate them from other communication units. Associated with each unit ID code are several other fields used to determine valid software parameters. The features field (202) lists which of the possible imbedded service features this unit is allowed to request and use. An applications and serial numbers field (203) lists the software applications each communication unit is authorized to possess and use. The applications, each uniquely identified by an authorized serial number, allow the communication units to access the features shown in the features field (202). A location, time, and count field (204) is used to temporarily store location identities and time indications of system accesses by the communication units. The count entry within the location, time, and count field (204) is used by the monitoring computer (115) to track the number of accesses to the communication systems (104, 109) by each communication unit. A group ID code field (205) associates an individual unit ID code to a group. Finally, a hard ID code field (210) associates a globally unique hardware identification code with each unit ID code (201). Hard ID's are globally unique in that they are programmed into the communication unit's hardware when the communication unit is manufactured, they cannot be reprogrammed, and they are never duplicated by the manufacturer. In contrast, unit ID codes (201) are not reused within a single communication system, but may be reused between different communication systems.

The combination of the table fields (201–210) provides stored service access information. For example, the communication unit identified by unit ID code 3 has the hard ID code 530 and is affiliated with group ID number 300. Communication unit 3 is allowed to use, by virtue of possessing the software application having serial number 49-46383, features 3, 4, and 5. Furthermore, it can be seen that communication unit 3 last accessed the system, for the second time, at 1400 hours (2 PM standard time) while located within site 6.

Similarly, a second table associates group identities with their authorized features and applications. A group ID code field (206) represents the identity of a group of communication units. Groups of communication units are normally associated with a unique group identity code to differentiate them from other groups of communication units. Associated with each group ID code are several other fields used to determine valid software parameters. The features field (207) lists which of the possible imbedded service features units of this group are allowed to request and use. An applications and serial numbers field (208) lists the software applications each communication unit within the group is authorized to possess and use. The applications, which are uniquely identified by an authorized serial number, allow each communication unit within the group to access the features shown in the features field (207). A copies field (209) identifies how many total copies of a particular application that the members of a group ID code are authorized to possess and use. For example, communication units affiliated with the group ID code 202 are allowed to use feature 11 only and are further authorized to use no more than 2 copies (as a group) of the requisite software application uniquely identified with serial number 30-29463.

FIG. 3 illustrates a block diagram of a communication unit (300) that includes a transceiver (301) operably coupled to the remainder of the communication unit (300) via a transceiver interface (302). The remainder of the communication unit (300) includes a microphone (303), a speaker (304), a central processing unit (CPU) (305), volatile memory (307), programmable non-volatile memory (308), and a data interface (309). Note that the transceiver (301) transmits and receives information using communication resources such as TDM (time-division multiplexed) slots, carrier frequencies, a pair of carrier frequencies or any other radio frequency (RF) transmission media.

The microphone (303) and speaker (304) provide inputs and outputs, respectively, for routine voice communications between users of two or more communication units. The CPU (305), which may comprise a Motorola 68HC11 microprocessor, provides control of the communication unit (300) and also provides direct communication to other external computing devices by way of the data interface (309), which may be an EIA standard port such as RS-232, RS-422, or another type. As indicated, the volatile memory (307) may be random-access memory (RAM) whereas the programmable non-volatile memory (308) can be a flash memory such as EEPROM. In a preferred embodiment, software applications used by the communication unit (300) are stored in the programmable non-volatile memory (308).

In operation, a user of the communication unit (300) may request a particular system service by initiating the appropriate function on the communication unit (for example, a push to talk function that prepares a request for a channel access message). Once initiated, the communication unit transmits, via a control channel, the request to a call processing controller (102, 107). In a preferred embodiment, the request contains a communication unit personality code and a service request message. Similarly, the call processing controller (102, 107) can transmit control information to the communication unit (300) via the control channel. In a preferred embodiment, the monitoring computer (115) monitors the control channel to determine authorized use of the communication unit as discussed with reference to FIG. 4.

Figure 4:
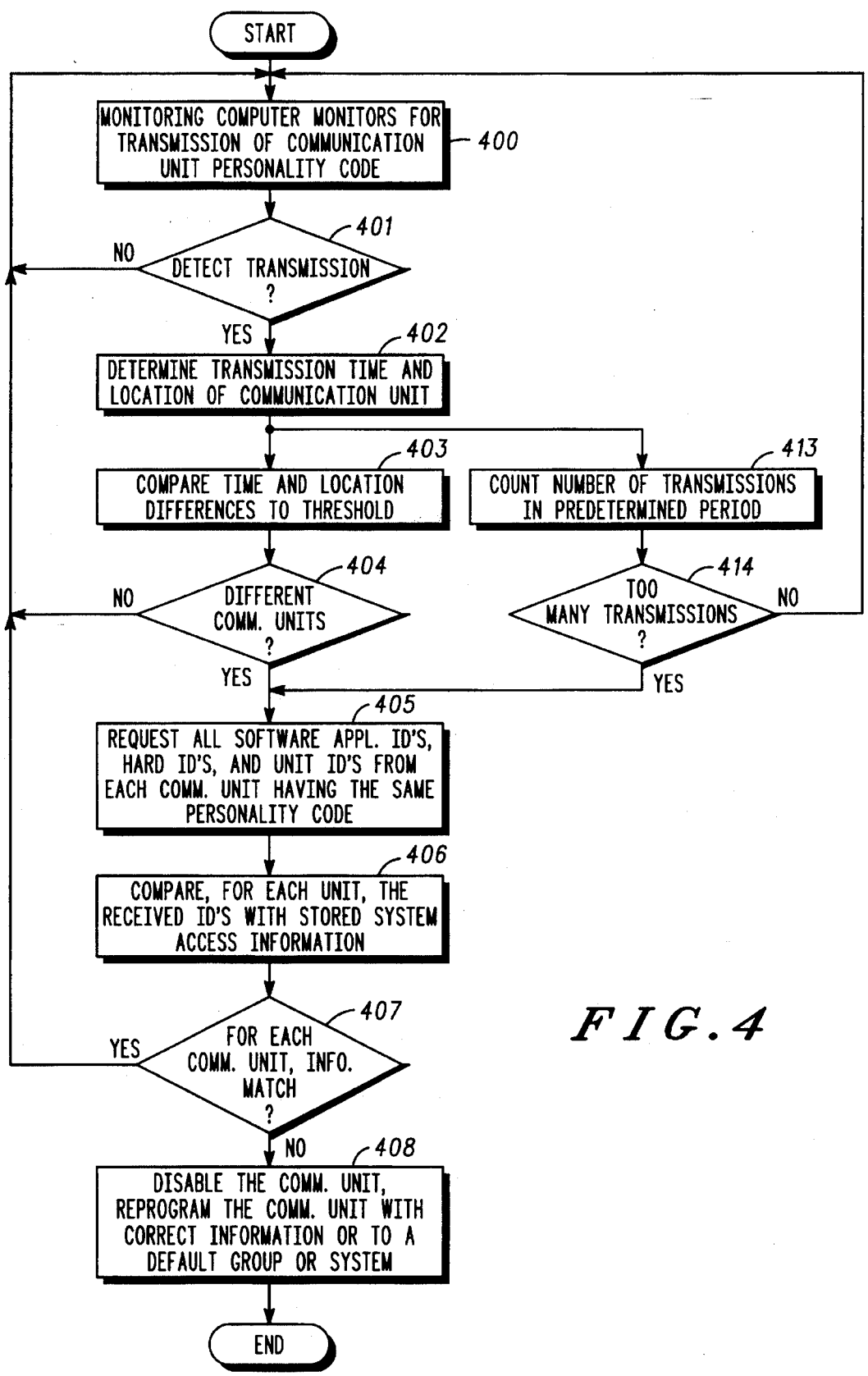
FIG. 4 illustrates a logic diagram that may be used to implement the present invention.

FIG. 4 illustrates a logic diagram that the monitoring computer (115) may incorporate to implement the present invention. At step 400, the monitoring computer (115) monitors a communication resource of a communication system for communication units' transmissions. As mentioned above, when a communication unit transmits a request for service (such as a request for channel access) the request contains a communication unit personality code and a service request message. The communication unit personality code serves to identify a communication unit within the system and may be a communication unit ID alone or a combination of a communication unit ID, a hard ID, and software application ID codes (serial numbers). The service request message typically contains a request for one of the following services: group dispatch call, private call, telephone interconnect, data call, or another type of service offered by the communication system.

When a transmission is detected (401), the monitoring computer determines a location and a transmission time for the transmitting communication unit (402) and stores this information in a database table. Also, a transmission count, indicating the number of times the transmitting communication unit has accessed the system, is incremented (see FIG. 2). In order to determine the presence of duplicate communication units, two techniques may be used.

In a first technique, a transmission time difference and a location difference are computed between the locations and transmission times for the two most recent transmissions by the communication unit and are compared against a transmission time threshold and a location threshold, respectively (403). If the transmission time difference is greater than the transmission time threshold and the location difference is less than the location threshold, it is assumed that the two most recent transmissions came from a single communication unit (404). Similarly, if both differences are greater than or less than their respective thresholds, a single communication unit is assumed. If, however, the transmission time difference is less than the transmission time threshold and the location difference is greater than the location threshold, indicating that the transmissions could not have originated from the same communication unit, the possibility for duplicated communication units is assumed, i.e., multiple communication units are using the same communication unit personality code (404).

As an example of the first technique, assume a transmission time threshold of 2 minutes and a location threshold of 3 miles. Furthermore, it is assumed that locations 5 and 7 are at least 4 miles apart. If the database tables show that communication unit 3 most recently transmitted from location 5 at 1527 hours (3:27 PM standard time) and that previously it had transmitted from location 7 at 1526 hours (3:26 PM standard time), it is assumed that communication unit 3 could not have traveled that distance (at least 4 miles) in that amount of time (1 minute), thus multiple communication units are using communication unit 3's personality code.

In a second technique for detecting duplicate communication units, the number of times a communication unit has accessed the system within a predetermined period of time is counted and compared with a predetermined number of transmissions (413). If the count exceeds the predetermined number of transmissions (414), duplicate communication units are assumed. For example, assume that the predetermined period of time is 10 hours and the predetermined number of transmissions is 250. If the database tables show that communication unit 2 has transmitted 300 times in a period of 10 hours, communication unit 2's personality code is being used by multiple communication units.

Regardless of how duplicated communication unit suspects are detected, the monitoring computer transmits a request for all software application ID's, hard ID's, and communication unit ID's to communication units having the communication unit personality code in question (405).

After receiving the requested ID's, the monitoring computer compares the received ID's (software application ID's, hard ID, and communication unit ID) for each communication unit with stored service access information (406). (The stored access information was discussed previously with reference to FIG. 2 and is stored in the database 117.) For each communication unit, if the received ID's match the stored service access information, no action is taken by the monitoring computer (407). For example, referring to FIG. 2 assume that the monitoring computer receives the following ID's from a communication unit in response to the request of step 405: communication unit ID 3, software application ID 49-46383, and hard ID 530. When the monitoring computer checks the database, it will find that the received ID's for this communication unit are authorized and no action will be taken. (Note that the same process applies if the group ID is used in place of the unit ID.)

If, however, the received ID's do not match, for each communication unit, an entry of the stored service access information (407), the monitoring computer reprograms the service access information of the communication unit (408). In order to reprogram the communication unit, the monitoring computer must request and receive a channel grant. Once the monitoring computer has a channel, the communication unit may be reprogrammed in a variety of ways. For example, the communication unit may be reprogrammed to overwrite at least a portion of its service access information with reprogramming information. The reprogramming information may be a correct list of system access privileges, instructions to disable the communication unit, a set of default services, instructions to re-affiliate the communication unit/group with a default communication group in the same system, or instructions to re-affiliate the communication unit/group with a default communication system.

The present invention provides a method for reprogramming duplicated communication units. With such a method, communication units that obtained valid unit IDs and valid system access privileges through illicit means can be detected and reprogrammed. Such units may be reprogrammed to have the system access privileges that are authorized for the unit, be disabled, or re-assigned to a default group or system. Prior art communication unit software and hardware protection methods and means did not address the problem of valid unit IDs and valid system access privileges being placed in unauthorized communication units. Specifically, RSS limits service access to valid ID's and software applications, however, RSS does not determine how the communication units received the system access privileges.

We claim:

1. In a wireless communication system, a method for reprogramming a communication unit, the method comprising the steps of:
   a) monitoring, by a monitoring computer, a communication resource for transmissions of a communication unit personality code;
   b) for at least two detections of the communication unit personality code, determining, by the monitoring computer, transmission times and locations of transmitting communication units that transmitted the communication unit personality code;
   c) determining, by the monitoring computer, that the transmitting communication units that originated the at least two detections of the communication unit personality code are duplicated communication units based on the transmission times and the locations of the transmitting communication units; and
   d) when it is determined that the transmitting communication units are duplicated communication units, reprogramming, by the monitoring computer, the transmitting communication units via a communication resource.

2. In the method of claim 1, step (a) further comprises the step of monitoring for transmissions of the communication unit personality code, wherein the communication unit personality code comprises at least one of a communication unit identification code, a hardware identification code, or a software application identification code.

3. In the method of claim 1, step (a) further comprises the step of monitoring for transmissions of the communication unit personality code, wherein the communication unit personality code comprises a combination of a communication unit identification code, a hardware identification code, and a software application identification code.

4. In the method of claim 1, step (c) further comprises the steps of:
   c1) computing a transmission time difference between the transmission times of the transmitting communication units and a location difference between the locations of the transmitting communication units;
   c2) comparing the transmission time difference and the location difference with a transmission time threshold and a location threshold, respectively; and
   c3) when the transmission time difference is less than the transmission time threshold and the location difference is greater than the location threshold, determining that the transmitting communication units are duplicated communication units.

5. In the method of claim 1, step (d) further comprises the step of reprogramming at least a portion of access information stored in the transmitting communication units such that the transmitting communication units are prohibited from accessing the wireless communication system.

6. In the method of claim 1, step (d) further comprises the step of reprogramming access information contained in the transmitting communication units such that the access information matches service access information stored in the monitoring computer.

7. In the method of claim 1, step (d) further comprises the step of reprogramming at least a portion of access information stored in the transmitting communication units such that the transmitting communication units can transmit only default service requests.

8. In the method of claim 1, step (d) further comprises the step of reprogramming at least a portion of access information stored in the transmitting communication units to affiliate the transmitting communication units with a default communication group or a default communication system.

9. In a wireless communication system a method for reprogramming a communication unit, the method comprising the steps of:
   a) transmitting, by a monitoring computer via a communication resource, a request for a communication unit personality code of the communication unit;
   b) upon receipt of the communication unit personality code, comparing, by the monitoring computer, the communication unit personality code with stored service access information;
   c) when the communication unit personality code is not representative of the stored service access information, sending, by the monitoring computer to the communication unit, reprogramming information; and
   d) overwriting, by the communication unit, at least a portion of service access information with the reprogramming information.

10. A method for reprogramming a communication unit, the method comprising the steps of:
   a) monitoring, by a monitoring computer, a communication resource for transmission of a communication unit personality code;
   b) determining, by the monitoring computer, a number of transmissions of the communication unit personality code during a predetermined period of time; and
   c) when the number of transmissions of the communication unit personality code exceeds a predetermined number of transmissions, reprogramming communication units that transmitted the communication unit personality code.

11. A method for a communication unit to have access privileges to a wireless communication system be reprogrammed, the method comprising the steps of:
   a) transmitting a communication unit personality code;
   b) receiving reprogramming information from a monitoring computer over a communication resource of the wireless communication system when the monitoring computer has determined that the communication unit is a duplicated communication unit; and
   c) overwriting at least a portion of service access information with the reprogramming information such that the communication unit is prohibited from future transmissions of the communication unit personality code.

12. A method for reprogramming a communication unit, the method comprising the steps of:
   a) monitoring, by a monitoring computer, a communication resource for transmission of a communication unit personality code;
   b) determining, by the monitoring computer, a first communication unit identification code and a first software application code of a first communication unit that transmitted the communication unit personality code, and a second communication unit identification code and a second software application code of a second communication unit that transmitted the communication unit personality code;

c) comparing, by the monitoring computer, the first and second communication unit identification codes and the first and second software application codes;

d) when the first and second software application codes are substantially identical and the first and second communication unit identification codes are not substantially identical, sending, by the monitoring computer to the first communication unit and the second communication unit, reprogramming information; and e) overwriting, by the first communication unit and the second communication unit, at least a portion of service access information with the reprogramming information.

* * * * *